United States Patent [19]

Takami et al.

[11] Patent Number: 5,413,976
[45] Date of Patent: May 9, 1995

[54] EXHAUST GAS PURIFICATION CATALYST

[75] Inventors: Akihide Takami, Hiroshima; Yasuto Watanabe, Iwakuni; Hideharu Iwakini, Hiroshima; Takashi Takemoto, Higashihiroshima, all of Japan

[73] Assignee: Mazda Motor Corporation, Hiroshima, Japan

[21] Appl. No.: 128,698

[22] Filed: Sep. 30, 1993

[30] Foreign Application Priority Data

Sep. 30, 1992 [JP] Japan .................. 4-261298

[51] Int. Cl.⁶ ........................................... B01J 29/068
[52] U.S. Cl. ............................................ 502/66; 502/64; 502/74; 423/213.2; 423/213.5; 423/239.1
[58] Field of Search ................. 502/66, 74; 423/213.5, 423/239.2

[56] References Cited

U.S. PATENT DOCUMENTS 5,223,236  6/1993  Inoue et al. .............. 423/239.2

FOREIGN PATENT DOCUMENTS

| 0514591 | 11/1992 | European Pat. Off. ......... 423/213.5 |
| 2-251247 | 10/1990 | Japan .................. 423/239.2 |
| 3-202157 | 9/1991 | Japan . |
| 4-267950 | 9/1992 | Japan .................. 423/239.2 |
| 5-076762 | 3/1993 | Japan .................. 423/239.2 |

*Primary Examiner*—Asok Pal
*Attorney, Agent, or Firm*—Keck, Mahin & Cate

[57] ABSTRACT

An exhaust gas purifying catalyst includes an active compound, including platinum (Pt) and iridium (Ir), as an essential active compound base and any combination of two or more metals of terbium (Tb), nickel (Ni), indium (In), tin (Sn), cobalt (Co) and cerium (Ce), excepting a combination of indium (In) and tin (Sn), as an additive active material. The base and additive active material are deposited on and carried by a silicate carrier.

20 Claims, 2 Drawing Sheets

EXHAUST GAS PURIFICATION CATALYST

BACKGROUND OF THE INVENTION

1. Field of the Invention

The present invention relates to an exhaust gas purifying catalyst with nitrogen oxide ($NO_x$) reducing properties that are little affected by exposure to exhaust gases.

2. Description of Related Art

Three-way catalysts have been widely used as engine exhaust gas purifying catalysts to simultaneously oxidize carbon monoxide (CO) and hydrocarbons (HC) and reduce nitrogen oxides ($NO_x$). Such a three-way catalyst is known to have strong nitrogen oxide ($NO_x$) purifying effects at air-fuel ratios of near 14.7 (the ideal air-fuel ratio). However, because there are high concentrations of oxygen in exhaust gases from what are known as "lean-burn" engines, which have recently been developed and made practicable in response to engine fuel regulations, these three-way catalysts can not effectively reduce or eliminate nitrogen oxides ($NO_x$).

Zeolite catalysts, which are produced by depositing an active catalytic material, such as copper (Cu), on silicate carriers, show great promise as catalysts capable of purifying emissions or removing pollutants by decomposition of nitrogen oxides ($NO_x$) in exhaust gas, in an atmosphere with a high concentration of oxygen, into nitrogen ($N_2$) and oxygen ($O_2$). Thus, investigations of numerous possible active materials have been conducted to achieve a zeolite catalyst with a high ability to reduce or eliminate nitrogen oxides ($NO_x$) despite numerous aspects of exhaust gases. For example, a technique for reducing nitrogen oxides ($NO_x$) with high efficiency in an atmosphere with a high concentration of oxygen has been proposed in Japanese Unexamined Patent Publication No. 3-202157. This technique attempts to achieve a catalyst containing or carrying copper (Cu), one or more alkaline earth metals, and one or more rare-earth elemental metals deposited on zeolite that has a good ability to reduce nitrogen oxides ($NO_x$) at temperatures of up to 800° C. and the durability required for extended periods of use.

However, although copper (Cu) ion-exchanged zeolite catalysts are considered effective in the reduction of nitrogen oxides ($NO_x$) and generally display 90% or greater reduction rates for nitrogen oxides ($NO_x$) in the laboratory, these reduction rates unavoidably decrease in an atmosphere with a high oxygen concentration associated with actual driving of practical lean-burn engines. This is caused by the altered chemical properties of exhaust gases discharged from practical automobiles and the like. Moreover, copper (Cu) ion-exchanged zeolite catalysts are deactivated at temperatures of 700° C. and above, sometimes even undergoing structural decomposition. In addition, with breakaway of aluminum (Al), the copper (Cu) ion-exchanged zeolite catalysts tend to cause an activity deterioration or reduction when vapor or steam is present in the exhaust gas.

Thus, although numerous attempts have been made to improve or increase the thermal resistance of this type of catalyst, applicational problems remain in that the temperature range of catalytic activity to exhaust gases shifts toward the side of higher temperatures when the catalysts are heated at high temperatures and also shifts toward the side of lower temperatures in vapor-containing atmospheres.

As described in the above-mentioned publication, improved thermal resistance is observed for catalysts formed by depositing copper (Cu), alkaline earth metals, and rare-earth elemental metals on silicate carriers. However, shifts in the active temperature range due to heat have not been taken into consideration for these catalysts, and the rate of the reduction of nitrogen oxides ($NO_x$) is poor at low temperatures below 300° C.

During repeated starting and stopping of vehicles on which lean-burn engines are mounted, the temperature of engine exhaust gas drops at the inlet of a catalytic converter. Accordingly, catalysts are required to have stable properties with improved purification ability at low temperatures and high thermal resistance.

Accordingly, extensive research was conducted by the inventors into catalysts, formed by depositing noble metals on silicate carriers, that could be expected to have good nitrogen oxide ($NO_x$) reducing properties in a range of low temperatures. As a result of this research, in spite of poor nitrogen oxide ($NO_x$) reducing properties of iridium (Ir) alone as compared to those of platinum (Pt), catalysts which indispensably or essentially include noble metals, in particular platinum (Pt) and iridium (Ir), deposited on silicate carriers as active materials, were found to have excellent activity due to synergistic effects and, hence, good nitrogen oxide ($NO_x$) reducing properties. Moreover, when rhodium (Rh) was used as an active material in addition to platinum (Pt) and iridium (Ir), the resulting catalyst was found to show improved heat resistance in addition to excellent activity in a range of low temperatures.

Catalysts of silicate carriers on which noble metals are deposited as active materials are good at reducing nitrogen oxides ($NO_x$) in exhaust gas at low temperatures. However, the range of active temperatures, including temperatures at which these catalysts exhibit their maximal activity, is narrow, and heating of these catalysts in a steam-containing atmosphere causes a shift in the maximum active temperature. Accordingly, a drawback is present in that such effects prevent sufficient exploitation of the essential properties of these catalysts.

Further extensive research was conducted by the present inventors into metals which exhibit behaviors much like iridium (Ir) which, when it is deposited on silicate carriers and coexists with platinum (Pt), promotes catalytic activity. This research led to an innovative exhaust gas purifying catalyst exhibiting excellent exhaust gas purification activity, even in a range of low temperatures, and having improved low-temperature catalytic activity. This catalyst has one or more metals, selected from iridium (Ir), III-B group elements, and IV-B group elements, and platinum (Pt) deposited on silicates. This catalyst is disclosed in Japanese Patent Application No. 4-141508, filed on Jun. 2, 1992.

With the catalyst of the above-mentioned application including a silicate carrier with platinum (Pt) and iridium (Ir), which are noble metals, indium (In), which is one of the III-B group elements, and tin (Sn), which is one of the IV-B group elements, deposited thereon, a shift in activity temperature range, including the temperature of maximum activity after a heating process, was found to be small compared to that of conventional nitrogen oxides ($NO_x$) reducing catalysts, and to display extremely little change in properties due to aging, in addition to the increased low-temperature activity.

SUMMARY OF THE INVENTION

It is an object of the present invention to provide an exhaust-gas purifying catalyst that, in addition to having improved nitrogen oxide ($NO_x$) reducing properties for exhaust gas at low temperatures, changes its nitrogen oxide ($NO_x$) reduction rate little even in a heating process in a steam-containing atmosphere.

The present invention was devised because of a theory that employing and adding of an additional metal or metals to a catalytic compound of platinum (Pt) and iridium (Ir) as an active base, which is deposited on a silicate carrier to form a catalyst, might also cause shifting of the temperature of maximum activity occurring after heat treatment in addition to the essential properties of the Pt-Ir catalytic compound base that provide an increase in catalytic activity. It was also believed that an exhaust gas purifying catalyst with excellent nitrogen oxides ($NO_x$) reducing properties would result.

The above object of the present invention is accomplished by providing an exhaust gas purifying catalyst which is produced by depositing a catalytic compound comprising noble metals, including platinum (Pt) and iridium (Ir), and one of several combinations of two or more additive metals including terbium (Tb), nickel (Ni), indium (In), tin (Sn), cobalt (Co) and cerium (Ce), but excluding the combination of indium (In) and tin (In), on a metal-containing silicate carrier.

Specifically, the exhaust gas purification catalyst, in which the combination of additive metals of indium (In) and cerium (Ce), or cobalt (Co) and terbium (Tb) are contained, exhibits a smaller shift in the active temperature range before and after being heated and an improved ability to reduce nitrogen oxides ($NO_x$). Furthermore, the catalyst in which the weight ratio of the total quantity of the additive metals, such as the combinations of indium (In) and cerium (Ce), and cobalt (Co) and terbium (Tb), falls within the range of 1/6 to ⅔ of the total quantity of platinum (Pt), exhibits excellent suppression of a shift in the active temperature range before and after being heated and achieves an excellent nitrogen oxide ($NO_x$) reducing effect.

The silicate on which the catalytic compound is deposited may be a Na-cation silicate or a H-cation silicate. Further, silicate carriers having various molar ratios of silica to metallic oxides, which are represented by silica-to-alumina ratios, may be used as desired.

The exhaust gas purifying catalyst according to the present invention exhibits only a slight reduction in the nitrogen oxide ($NO_x$) reduction rate and nearly no shift in the active temperature range even after being heated. This is achieved by adding two or more additive metals mixed with the Pt-Ir active compound base and attributable to the effects described below.

The reason it is preferable to deposit more than two additive metals is that the individual additive metals form multiple oxides and are thereby stabilized. It is understood that platinum (Pt) becomes resistive against reduction due to this stabilization by oxidation and more is activated so as to prevent a downward shift in active temperature. Further, the reason there is little decrease in the nitrogen oxide ($NO_x$) reduction rate is that the solid impediments presented by the multiple oxides are substantial, lowering reactivity and preventing sintering of the catalytic active compound or material.

DETAILED DESCRIPTION OF THE PREFERRED EMBODIMENT

Figure 1:
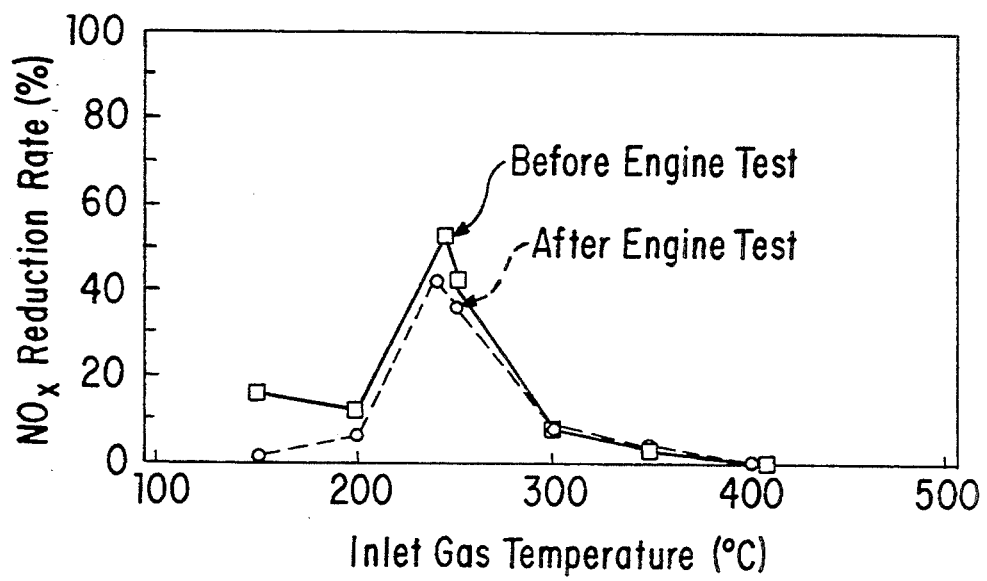
FIG. 1 is a diagram showing nitrogen oxide ($NO_x$) purifying properties of a catalyst $Y_1$ in accordance with a preferred embodiment II of the present invention.

Various experimental studies were conducted on metals listed in Table I, as a single additive metal to be added to a platinum-iridium (Pt-Ir) active compound base and deposited on a silicate carrier, which were predicted to be easily deposited if they were in the form of an oxide coexisting with platinum (Pt) and iridium (Ir). Each of these metals was singularly added to the Pt-Ir active compound base which has a deposited ratio of 3:1. Each additive metal was added so that the mixed catalytic compound contains one portion of the additive metal and three portions of platinum (Pt) in weight ratio. This catalytic compound containing platinum (Pt), iridium (Ir) and one of the metals listed in Table I was used to prepare sample catalysts. The respective catalysts were examined by using a model gas under conditions nearly equivalent to a lean-burn air-fuel ratio of 22 to obtain maximum nitrogen oxides ($NO_x$) reduction rates at a space velocity of 55,000 $h^{-1}$ before and after having been heated at 800° C. for 8 hours in air. The examination also considered deterioration rates after the heating process and, for some of the catalysts, the temperatures at which the maximum nitrogen oxides ($NO_x$) reduction rates occurred.

TABLE I

| Metal | Before Heating | | After Heating | | Deterioration Rate (%) |
|---|---|---|---|---|---|
| | Reduction Rate (%) | Temperature (°C.) | Reduction Rate (%) | Temperature (°C.) | |
| None | 65.9 | | 31.4 | 275 | 52.4 |
| In | 23.8 | 285 | 19.7 | 350 | 17.2 |
| Sn | 33.3 | 280 | 20.0 | 280 | 39.9 |
| Ce | 28.6 | 265 | 18.0 | 275 | 32.1 |
| Tb | 27.6 | 270 | 20.5 | 290 | 25.7 |
| Co | 29.0 | 260 | 18.0 | 275 | 37.9 |
| Ni | 38.1 | 245 | 20.5 | 275 | 46.0 |
| Sr | 32.6 | | 11.4 | | 65.0 |
| Mn | 34.2 | | 15.4 | | 55.0 |
| V | 32.6 | | 9.5 | | 71.0 |
| Bi | 24.8 | | 9.1 | | 63.5 |
| Ti | 20.5 | | 8.8 | | 57.0 |
| Zn | 31.6 | | 13.0 | | 58.9 |
| Ga | 39.0 | | 12.7 | | 67.4 |

The results shown in Table I indicate that the sample catalysts, in which a single additive metal was added to the Pt-Ir active compound base and deposited, exhibited poor nitrogen oxide ($NO_x$) reduction rates both before and after the heating process and were of little utility consequently. These sample catalysts, which had been subjected to a heating process at 400° C. for a fixed time in a steam-containing atmosphere, proved that the active temperature ranges of the sample catalysts shifted toward the side of lower temperatures. Accordingly, although catalysts may exhibit high rates of nitrogen oxide ($NO_x$) reduction, these catalysts, having an active temperature range which tends to shift toward the side of lower temperatures relating to the reduction of nitrogen oxide ($NO_x$) under heated and steam-containing conditions, are undesirable, as are catalysts containing a Pt-Ir active compound base alone.

Embodiment I

Based on the experimental results shown in Table I above, combinations were made of metals that, when deposited along with a Pt-Ir active compound base on a silicate carrier, exhibited an ability to suppress both an upward shift of the active temperature range after a heating process on the catalyst and a downward shift of the active temperature range in a steam-containing and heated atmosphere.

Combinations were made of two or more metals from the metals having practically useful nitrogen oxide ($NO_x$) reduction rates after the heating process. These metals were terbium (Tb), nickel (Ni), indium (In), tin (Sn), cobalt (Co) and cerium (Ce), as demonstrated by the experimental results shown in Table I. However, in this instance, the combination of indium (In) from the III-B group elements and tin (Sn) from the IV-B group elements was excluded. Each of these combinations of metals, as shown in Table II, was admixed with the Pt-Ir active compound base, and the respective resultant catalytic compound was deposited on a silicate carrier to prepare 14 different catalysts.

TABLE II

| Metal Combination | Before Heating Reduction Rate (%) | Before Heating Temperature (°C.) | After Heating Reduction Rate (%) | After Heating Temperature (°C.) | Deterioration Rate (%) |
| --- | --- | --- | --- | --- | --- |
| Tb—Ni | 32 | 260 | 14 | 300 | 56.3 |
| Tb—In | 36 | 270 | 15 | 305 | 58.3 |
| Tb—Sn | 36 | 250 | 13 | 305 | 63.9 |
| Tb—Co | 35 | 270 | 17 | 305 | 51.4 |
| Tb—Ce | 28 | 270 | 11 | 305 | 61.0 |
| Ni—In | 33 | 270 | 15 | 300 | 54.5 |
| Ni—Sn | 33 | 260 | 14 | 305 | 57.6 |
| Ni—Co | 36 | 250 | 17 | 300 | 52.8 |
| Ni—Ce | 37 | 250 | 17 | 290 | 54.1 |
| In—Co | 36 | 290 | 15 | 305 | 58.3 |
| In—Ce | 41 | 270 | 17 | 290 | 58.3 |
| Sn—Co | 28 | 280 | 15 | 320 | 46.4 |
| Sn—Ce | 38 | 270 | 15 | 320 | 60.5 |
| Co—Ce | 36 | 250 | 16 | 300 | 55.6 |

In the preparation of the catalysts, used as a platinum (Pt) material and an iridium (Ir) material were a bivalent platinum amine and iridium trichloride, respectively. These additive metals and their metallic salts (nitrates, sulfates, and the like) of each metal of each combination listed above were weighed out in component proportions which are described later. The weighed materials were intimately mixed and dispersed using ion-exchange water and ethanol as a solvent. Then, the silicate carrier was added to the solution to form a slurry. After maintaining this slurry mixture at 80° C. for four hours to vaporize and exhale sufficiently the solvent, the slurry mixture was dried at 150° C. for four hours to obtain the catalysts. Although a Na-containing zeolite ZSM-5 (silica-alumina ratio=30) was employed as the silicate carrier, other silicate carriers such as, for example, H-containing silicate carriers, silicate carriers of other silica-alumina ratios, and silicate carriers containing various desired metals, may be used.

The component ratio of $Pt:Ir:M_1:M_2$ of a catalytic compound, which consists of a Pt-Ir active compound base and two metals, $M_1$ and $M_2$, combined as described above and deposited on the silicate carrier, was 3:1:0.5:0.5. Each of the component materials of this ratio was weighed out and subjected to the respective processing detailed above to prepare the individual catalyst compounds. The evaluated results are presented in Table II as to the maximum nitrogen oxide ($NO_x$) reduction rates, the temperatures at which these maximum reduction rates occurred for each of these catalysts before and after having been heated at 800° C. for eight hours in air, and the rates of deterioration of nitrogen oxide ($NO_x$) reduction rates between these maximum reduction rates before and after heating process. As is clearly understood from Table II, these catalysts show excellent nitrogen oxide ($NO_x$) reducing properties both before and after the heating process.

These 14 different catalysts were effectively suppressed in their tendencies to shift in the active temperature range upward, i.e., to the side of higher temperatures, in the heating process. Moreover, no shifting in the active temperature range downward, i.e., to the side of lower temperatures, or only an extremely slight downward shifting in the active temperature range, was noticed even with the application of heating process at 400° C. for a predetermined period in a steam-containing atmosphere.

As greatly preferable combinations of the additive active metals $M_1$ and $M_2$ to be added to the Pt-Ir active compound base, the combinations of indium and terbium (In-Tb), indium and nickel (In-Ni), indium and cerium (In-Ce), and cobalt and terbium (Co-Tb), which exhibited excellent nitrogen oxide ($NO_x$) reduction rates both before and after the heating process, were selected. By depositing each of these combinations of additive active metals ($M_1$ and $M_2$) on the metal-containing silicate carrier along with the Pt-Ir active compound base, various catalysts were prepared. In this instance, the component ratio of $Pt:Ir:M_1:M_2$ of the catalytic compound was adjusted as follows:

(a) $Pt:Ir:M_1:M_2=3:1:0.25:0.25$ (b) $Pt:Ir:M_1:M_2=3:1:0.5:0.5$ (c) $Pt:Ir:M_1:M_2=3:1:1:1$

Using a model gas under conditions nearly equivalent to a lean-burn condition of an air-fuel ratio of 22 at a space volume of 55,000 $h^{-1}$, the maximum nitrogen oxide ($NO_x$) reduction rates before and after the heating process at 800° C. for eight hours in air, the temperatures at which these maximum reduction rates occurred, and the rate of deterioration in nitrogen oxide ($NO_x$) reduction rates of these maximum rates before and after the heating process were measured for the groups of the individual catalysts having the component ratios designated by (a), (b) and (c) above, which are hereafter referred as the catalysts $X_1$, $X_2$ and $X_3$, respectively. The results for the catalysts $X_1$, $X_2$ and $X_3$ are given in Tables III, IV and V, respectively. In this instance, the model gas used in these measurements had components of 5,500 ppm of hydrocarbon (HC), carbon (C), 0.15% of carbon monoxide (CO), 2,000 ppm of nitrogen oxides ($NO_x$), 7.5% of oxygen ($O_2$), 8–9% of carbon dioxide ($CO_2$), 150 ppm of hydrogen ($H_2$), and nitrogen ($N_2$) of B1.

TABLE III

| Metal Combination | Before Heating Reduction Rate (%) | Before Heating Temperature (°C.) | After Heating Reduction Rate (%) | After Heating Temperature (°C.) | Deterioration Rate (%) |
| --- | --- | --- | --- | --- | --- |
| In—Tb | 38.9 | 260 | 11.9 | 300 | 69.4 |
| In—Ni | 37.9 | 246 | 12.7 | 310 | 66.5 |
| In—Ce | 38.6 | 256 | 13.4 | 310 | 65.3 |
| Co—Tb | 34.9 | 260 | 14.3 | 300 | 59.0 |

TABLE IV

| Metal Combination | Before Heating Reduction Rate (%) | Before Heating Temperature (°C.) | After Heating Reduction Rate (%) | After Heating Temperature (°C.) | Deterioration Rate (%) |
|---|---|---|---|---|---|
| In—Tb | 36 | 270 | 15 | 305 | 58.3 |
| In—Ni | 33 | 270 | 15 | 300 | 54.5 |
| In—Ce | 41 | 270 | 17 | 290 | 58.5 |
| Co—Tb | 35 | 270 | 17 | 305 | 51.4 |

TABLE I

| Metal Combination | Before Heating Reduction Rate (%) | Before Heating Temperature (°C.) | After Heating Reduction Rate (%) | After Heating Temperature (°C.) | Deterioration Rate (%) |
|---|---|---|---|---|---|
| In—Tb | 29.9 | 266 | 11.8 | 310 | 60.5 |
| In—Ni | 28.3 | 265 | 10.5 | 316 | 62.9 |
| In—Ce | 24.0 | 275 | 11.1 | 300 | 53.8 |
| Co—Tb | 31.1 | 258 | 14.8 | 297 | 52.4 |

It is apparent from the results shown in Tables III, IV and V that the second group of catalysts $X_2$ shown in Table IV have levels of deterioration, i.e., a change in nitrogen oxide ($NO_x$) reduction rates, between before and after the heating process at 800° C. for eight hours in air, comparable to those of the first and third groups of catalysts $X_1$ and $X_3$ shown in Tables III and V. However, the second group of catalysts also exhibits better nitrogen oxide ($NO_x$) reduction rates, both before and after the heating process, than the other groups of sample catalysts. Additionally, these groups of catalysts show that there is a preferable range of component ratios of additive metals $M_1$ and $M_2$ added to the Pt-Ir active compound base. In other words, if the additive metals $M_1$ and $M_2$ are added in excessively large quantities, the activity of the catalyst decreases. Conversely, if the additive metals $M_1$ and $M_2$ are added in excessively small quantities, the effect of suppressing the shift in the active temperature range tends to disappear.

Thus, if the total quantity of additive metals $M_1$ and $M_2$ added to the Pt-Ir active compound base is equal to or less than the total quantity of platinum (Pt) and iridium (Ir) and less than 1/6 of the quantity of platinum (Pt), the effect of suppressing the active temperature range effect disappears. Further, if the total quantity of additive metals $M_1$ and $M_2$ added to the Pt-Ir active material is equal to or less than the total quantity of platinum (Pt) and iridium (Ir) and greater than ⅔ of the quantity of platinum (Pt), the activity of the catalyst decreases. Accordingly, the total quantity of additive metals $M_1$ and $M_2$ is preferred to be between 1/6–⅔ of the quantity of platinum (Pt).

Within the group of catalysts $X_2$ prepared with a component ratio of Pt:Ir:$M_1$:$M_2$ of 3:1:0.5:0.5 shown in Table IV, the combinations in which indium and cerium (In-Ce), and cobalt and terbium (Co-Tb) were used as additive metals $M_1$ and $M_2$ had comparatively excellent nitrogen oxide ($NO_x$) reduction rates both before and after the heating process and, consequently, are combinations offering practical advantages.

Embodiment II

The combination of additive metals of indium (In) and cerium (Ce), which was considered to have practical advantages on the basis of the results shown in Tables III-V, was used to prepare a catalytic compound at a component ratio of Pt:Ir:In:Ce of 3:1:0.5:0.5. This catalytic compound was deposited on two different silicate carriers described below to prepare two different catalysts $Y_1$ and $Y_2$. After mixing each of the two catalytic compounds with 20 weight percent of an alumina binder, the mixed catalytic compounds were wash-coated (in a coated quantity of about 30 percent by weight) to cordierite honeycomb bases (which had 400 cells per square inch) so as to permit a space velocity of 25,000 $h^{-1}$, and dried and sintered to prepare the catalysts $Y_1$ and $Y_2$. The silicate carriers for the catalysts $Y_1$ and $Y_2$ may be of Na-containing silicate carriers with silica-alumina ratios of 70 and 200, respectively.

For comparative study, a comparative catalyst $Y_3$ was prepared with a Na-containing silicate carrier with a silica-alumina ratio of 30, in the same procedures as the catalysts $Y_1$ and $Y_2$, which had a component ratio of Pt:Ir of 3:1 and 3 g of additive metals, i.e., platinum (Pt) and iridium (Ir), in total quantity per one liter of catalyst.

Measurements were made using a simulated gas evaluation device, well known to those skilled in the art, for the catalysts $Y_1$ and $Y_2$ and the comparative catalyst $Y_3$ both before the heating process to evaluate their nitrogen oxide ($NO_x$) reducing properties. Each of the catalysts $Y_1$, $Y_2$ and $Y_3$ was then installed in an exhaust system downstream from, for instance, a four-cylinder, 1,300 cc practical engine for conducting actual functional tests. In the test, the engine was run for 20 hours under a condition in which the exhaust gas had a temperature of 250° C., at which nitrogen oxides ($NO_x$) are reduced, at the inlet of a catalytic converter. After the practical engine tests, evaluation studies of nitrogen oxide ($NO_x$) reducing properties were conducted again for the respective catalysts $Y_1$, $Y_2$ and $Y_3$, using the simulated gas evaluation device. The evaluation results of nitrogen oxide ($NO_x$) reducing properties before and after the practical engine test for the respective catalysts $Y_1$, $Y_2$ and $Y_3$ are shown in FIGS. 1, 2 and 3, respectively.

Figure 2:
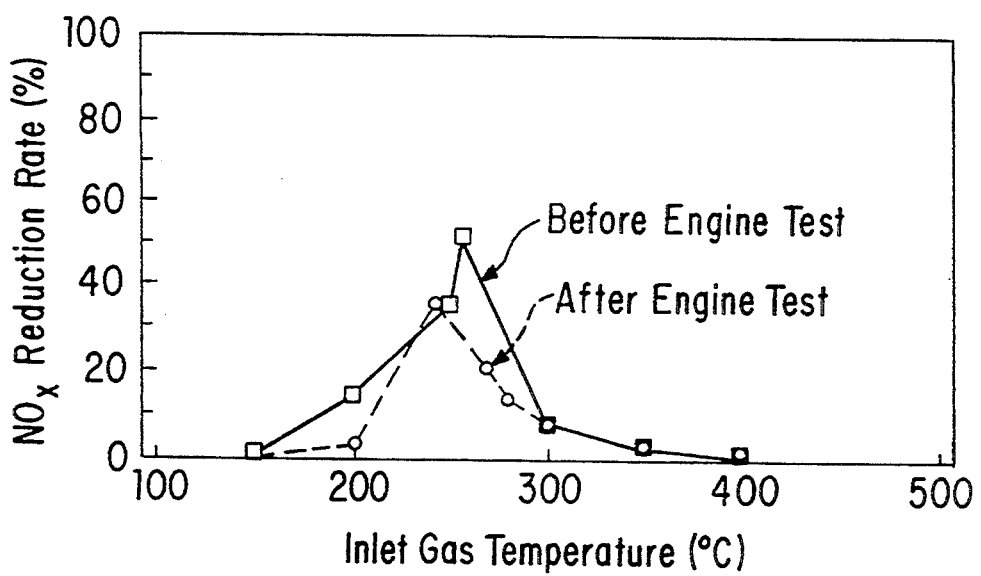
FIG. 2 is a diagram showing nitrogen oxide ($NO_x$) purifying properties of a catalyst $Y_2$ in accordance with the preferred embodiment II of the present invention.

From the results shown in FIG. 1, it is clearly proved that the catalyst $Y_1$ causes neither any substantial drop or deterioration in nitrogen oxide ($NO_x$) reduction rate nor any substantial shift in active temperature range even after the actual engine test, affirming its excellent nitrogen oxide ($NO_x$) reducing properties. From the results shown in FIG. 2, it is also proved that although the catalyst $Y_2$ exhibits a slight drop or deterioration in nitrogen oxide ($NO_x$) reducing properties after the actual engine test and only a small shift in active temperature range, this drop and this shift are comparatively minor and negligible so as to have nitrogen oxide ($NO_x$) reducing properties without practical drawbacks.

Figure 3:
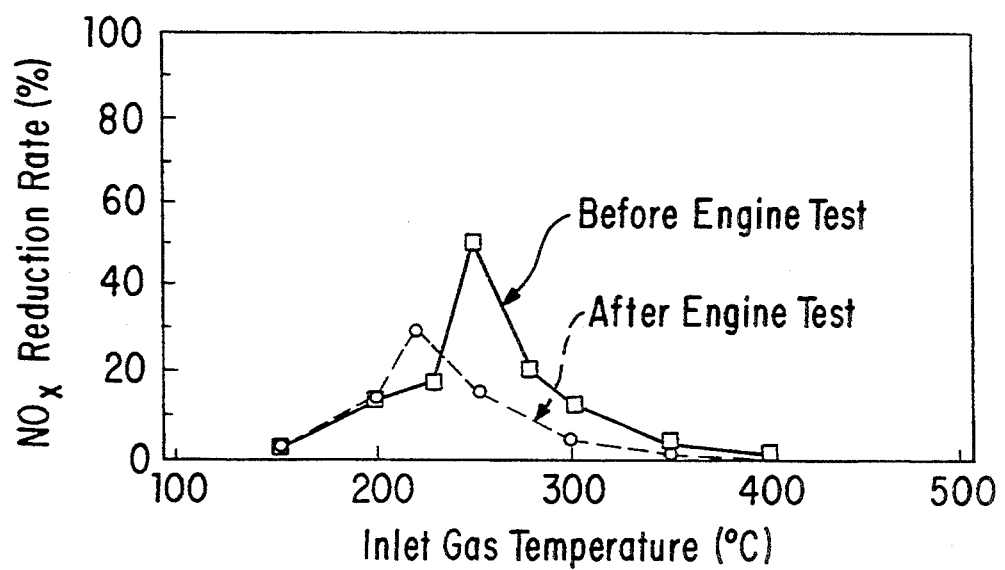
FIG. 3 is a diagram showing nitrogen oxide ($NO_x$) purifying properties of a comparative catalyst $Y_3$.

By contrast, the comparative catalyst $Y_3$ shown in FIG. 3 exhibits a large drop or deterioration in nitrogen oxide ($NO_x$) reduction rate and a substantial shift in active temperature range after the actual engine test, indicating a considerable deterioration in nitrogen oxide ($NO_x$) reducing properties resulting from the actual engine test.

Thus, the exhaust gas purification catalyst in accordance with the embodiment II of the present invention clearly has excellent nitrogen oxide ($NO_x$) reducing properties as compared to the conventional exhaust gas purifying catalysts consisting of, for example, a Pt-Ir active compound base alone deposited on a silicate carrier.

Embodiment III

Other than the two-element combinations listed in Table 2, combinations of three or more elements, excluding combinations including both indium (In) and tin (Sn), were selected as additive active metals from among terbium (Tb), nickel (Ni), indium (In), tin (Sn), cobalt (Co), and cerium (Ce) and were deposited, along with the Pt-Ir catalytic compound base, on silicate carriers to prepare various other catalytic compounds. These catalytic compounds were subjected to the same procedure as those in Embodiment I to prepare catalysts $Z_1$ and $Z_2$.

Specifically, an In-Ce-Tb three-element additive active material and an In-Ce-Co-Tb four-element additive active material were prepared and separately mixed with the Pt-Ir catalytic compound bases to prepare catalytic compounds. The catalytic compound Z exhibited not only an excellent nitrogen oxide ($NO_x$) reduction rate but also only minor shifts in the active temperature range when the total proportion of the In-Ce-Tb three-element additive active material in one case and the In-Ce-Co-Tb four-element additive active material in another case was one part per three parts of platinum (Pt).

Embodiment IV

As another preferred embodiment of the present invention, an additive active metal, for instance rhodium (Rh), was added to the noble metal catalytic compound base consisting of platinum (Pt) and iridium (Ir) used in the previous embodiments I-III. This Pt-Ir-Rh additive active material, essentially including platinum (Pt) and iridium (Ir), was deposited with each of the combinations of previously described metals, other than the metals platinum (Pt), iridium (Ir) and rhodium (Rh), on silicate carriers to provide exhaust gas purifying catalysts. These resultant catalysts had, in addition to stable nitrogen oxide ($NO_x$) reduction rates and active temperature ranges with suppressed shifts in active temperature range, which the catalysts of the above-described embodiments also exhibited, an improved heat resistance and excellent nitrogen oxide ($NO_x$) reducing properties.

As described above, since the exhaust gas purifying catalyst comprises noble metals, such as platinum (Pt) and iridium (Ir), which are deposited on a silicate carrier along with or in combination with two or more additive active metals suitably selected from among terbium (Tb), nickel (Ni), indium (In), tin (Sn), cobalt (Co) and cerium (Ce), a drop or deterioration in the rate of nitrogen oxide ($NO_x$) reduction is effectively prevented, and downward shifting in the range of active temperatures due to thermal deterioration under conditions in which the catalyst is subjected to high temperatures in a steam-contained atmosphere is effectively suppressed.

The combinations of additive active metals of indium and cerium (In-Ce), and cobalt and terbium (Co-Tb) added to or mixed with the Pt-Ir catalytic compound base, which are deposited on metal-containing silicate carriers, improve the rate of nitrogen oxide ($NO_x$) reduction both before and after the heating process, preventing the deterioration of nitrogen oxide ($NO_x$) reducing properties.

Limiting the total quantity of additive active metals to 1/6–⅔ of the quantity of platinum of the Pt-Ir catalytic compound base prevents or suppresses a drop in nitrogen oxide ($NO_x$) reduction rate and shifting of an active temperature range, so that the catalysts show only extremely small changes in nitrogen oxide ($NO_x$) reducing properties due to aging while being actually installed in exhaust systems of automobile engines.

It is to be noted that although the present invention has been described with respect to preferred embodiments thereof, various other embodiments and variants which fall within the scope and spirit of the invention, may occur to those skilled in the art. Such other embodiments and variants are intended to be covered by the following claims.

What is claimed is:

1. An exhaust gas purifying catalyst comprising:
   a silicate carrier; and
   an active material carried by said silicate carrier, said active material comprising platinum (Pt) and iridium (Ir) as an essential active material base, and any combination of at least two metals including terbium (Tb), nickel (Ni), indium (In), tin (Sn), cobalt (Co) and cerium (Ce), excepting a combination of indium (In) and tin (Sn), as an additive active material.

2. An exhaust gas purifying catalyst as defined in claim 1, wherein said active material essentially includes three portions of said platinum (Pt) and one portion of said iridium (Ir).

3. An exhaust gas purifying catalyst as defined in claim 2, wherein said platinum (Pt) and said iridium (Ir) are a bivalent platinum amine and iridium trichloride, respectively.

4. An exhaust gas purifying catalyst as defined in claim 1, wherein said active material comprising platinum (Pt) and iridium (Ir) and two metals, $M_1$ and $M_2$, of said combination has a component ratio of Pt:Ir:$M_1$:$M_2$ of 3:1:0.5:0.5.

5. An exhaust gas purifying catalyst as defined in claim 4, wherein a total weight of said metals $M_1$ and $M_2$ is between 6/1 and 3/2 of a weight of said platinum (Pt).

6. An exhaust gas purifying catalyst as defined in claim 4, wherein said metals $M_1$ and $M_2$ are indium (In) and cerium (Ce), respectively.

7. An exhaust gas purifying catalyst as defined in claim 6, wherein a total weight of said indium (In) and said cerium (Ce) is between 6/1 and 3/2 of a weight of said platinum (Pt).

8. An exhaust gas purifying catalyst as defined in claim 4, wherein said metals $M_1$ and $M_2$ are cobalt (Co) and terbium (Tr), respectively.

9. An exhaust gas purifying catalyst as defined in claim 8, wherein a total weight of slid cobalt (Co) and said terbium (Tr) is between 6/1 and 3/2 of a weight of said platinum (Pt).

10. An exhaust gas purifying catalyst as defined in claim 1, wherein said silicate carrier is an Na-zeolite ZSM-5 having a silica-alumina ratio of 30.

11. An exhaust gas purifying catalyst as defined in claim 1, wherein said silicate carrier is an H-containing silicate carrier.

12. An exhaust gas purifying catalyst as defined in claim 6, wherein said silicate carrier is an Na-containing silicate carrier having a silica-alumina ratio of 70.

13. An exhaust gas purifying catalyst as defined in claim 6, wherein said silicate carrier is an Na-containing silicate carrier having a silica-alumina ratio of 200.

14. An exhaust gas purifying catalyst as defined in claim 1, wherein said active material comprising platinum (Pt) and iridium (Ir) and two metals, $M_1$ and $M_2$, of said combination has a component ratio of Pt:Ir:$M_1$:$M_2$ of 3:1:0.25:0.25.

15. An exhaust gas purifying catalyst as defined in claim 1, wherein said active material comprising platinum (Pt) and iridium (Ir) and two metals, $M_1$ and $M_2$, of said combination has a component ratio of $Pt:Ir:M_1:M_2$ of 3:1:1:1.

16. An exhaust gas purifying catalyst as defined in claim 1, wherein said active material comprises platinum (Pt) and iridium (Ir) as an essential active material base, and indium (In), cerium (Ce) and terbium (Tb) as an additive active material.

17. An exhaust gas purifying catalyst as defined in claim 15, wherein said active material comprises one portion of said additive active material per one portion of said essential active material base.

18. An exhaust gas purifying catalyst as defined in claim 1, wherein said active material comprises platinum (Pt) and iridium (Ir) as an essential active material base, and indium (In), cerium (Ce), cobalt (Co) and terbium (Tb) as an additive active material.

19. An exhaust gas purifying catalyst as defined in claim 17, wherein said active material comprises one portion of said additive active material per one portion of said essential active material base.

20. An exhaust gas purifying catalyst as defined in claim 1, wherein said active material further includes rhodium (Rh) as a part of said essential active material base.

* * * * *